United States Patent [19]
McWilliams

[11] 3,885,682
[45] May 27, 1975

[54] MAIL BAG HANDLING APPARATUS

[76] Inventor: Joseph E. McWilliams, 1345 Canterbury Ln., Glenview, Ill. 60025

[22] Filed: July 15, 1974

[21] Appl. No.: 488,502

Related U.S. Application Data

[63] Continuation of Ser. No. 306,006, Nov. 13, 1972, abandoned.

[52] U.S. Cl. ............... 214/6 G; 198/88; 198/110; 214/41
[51] Int. Cl. ..................... B65g 57/12; B65g 67/08
[58] Field of Search ............................ 214/6 G, 41; 198/2–5, 88, 97, 99, 100, 110

[56] References Cited
UNITED STATES PATENTS

| 2,150,211 | 3/1939 | Edwards | 214/41 X |
| 2,648,422 | 8/1953 | Kling | 198/99 |
| 2,990,938 | 7/1961 | Sheehan | 198/2 X |

FOREIGN PATENTS OR APPLICATIONS

| 1,556,087 | 1/1970 | Germany | 214/41 |
| 1,499,982 | 9/1967 | France | 214/41 |

*Primary Examiner*—Robert G. Sheridan
*Attorney, Agent, or Firm*—Mann, Brown, McWilliams & Bradway

[57] ABSTRACT

Mail bag handling apparatus comprising an elongate wheeled conveyor for transferring mail bags between a loading dock and an end loading highway vehicle which is positioned on the dock for running under existing mail bag handling conveyors for storage purposes, and for movement into the vehicle to extend between the existing conveyor and a point adjacent where the bags are to be loaded or unloaded relative to the vehicle. The conveyor has mounted on its forward end a wheel assembly on which the conveyor forward end rides and which mounts cantilever fashion a loader head in the form of a short belt conveyor structure in which the loader head articulates about its mounting under power controls for adjustment of the projecting end of same horizontally and vertically relative to the wheeled conveyor to accommodate mail bag loading and unloading.

5 Claims, 11 Drawing Figures

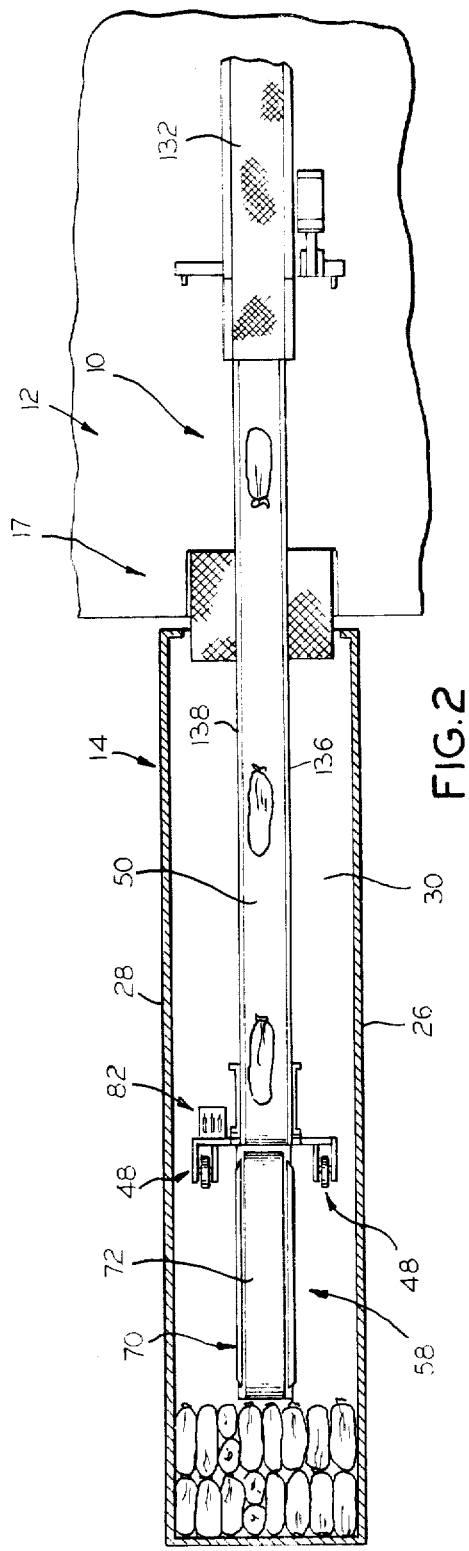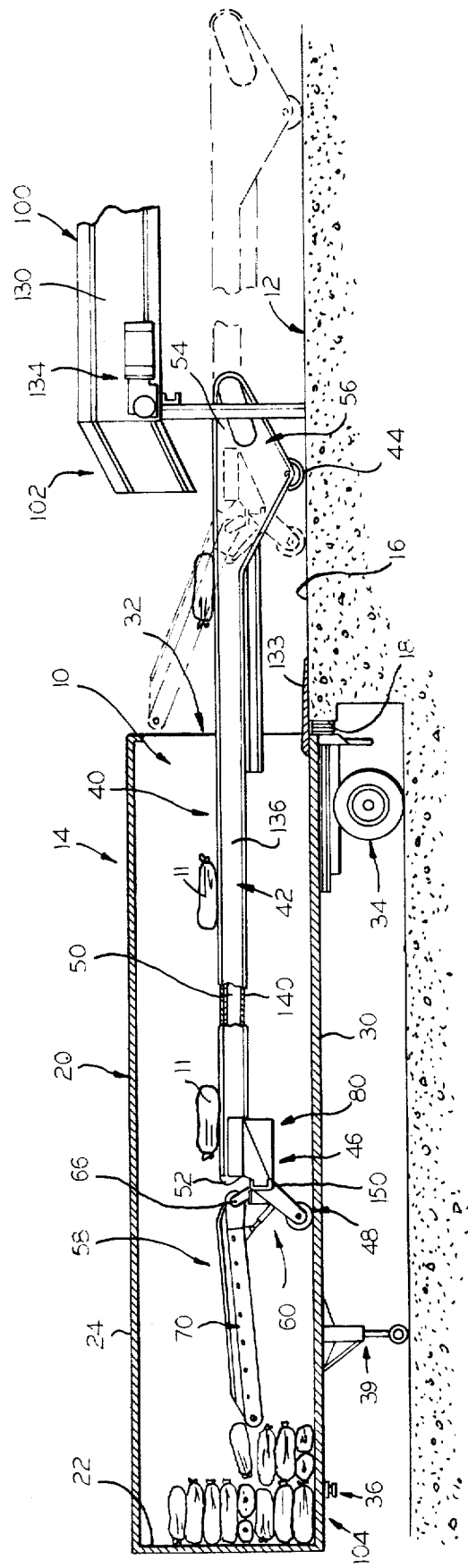
FIG.2
FIG.1

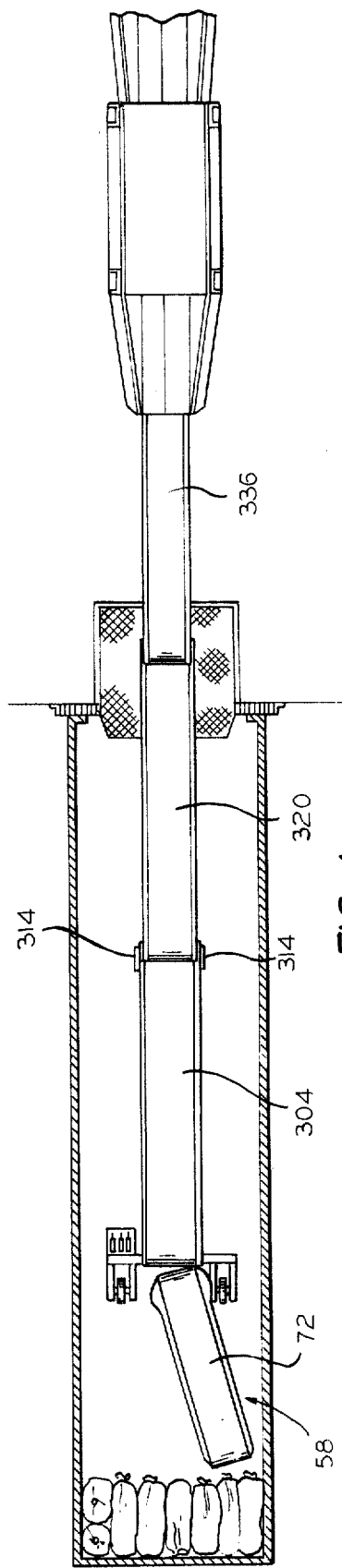
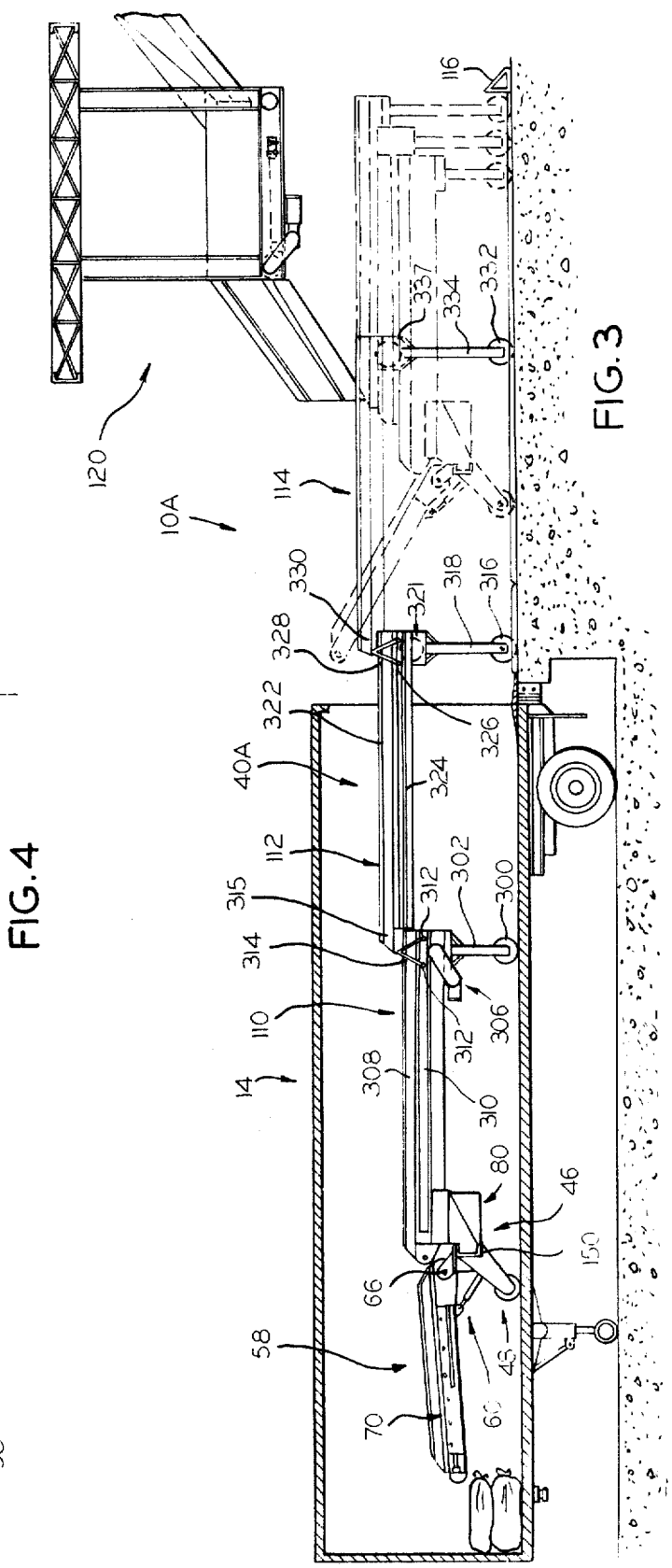

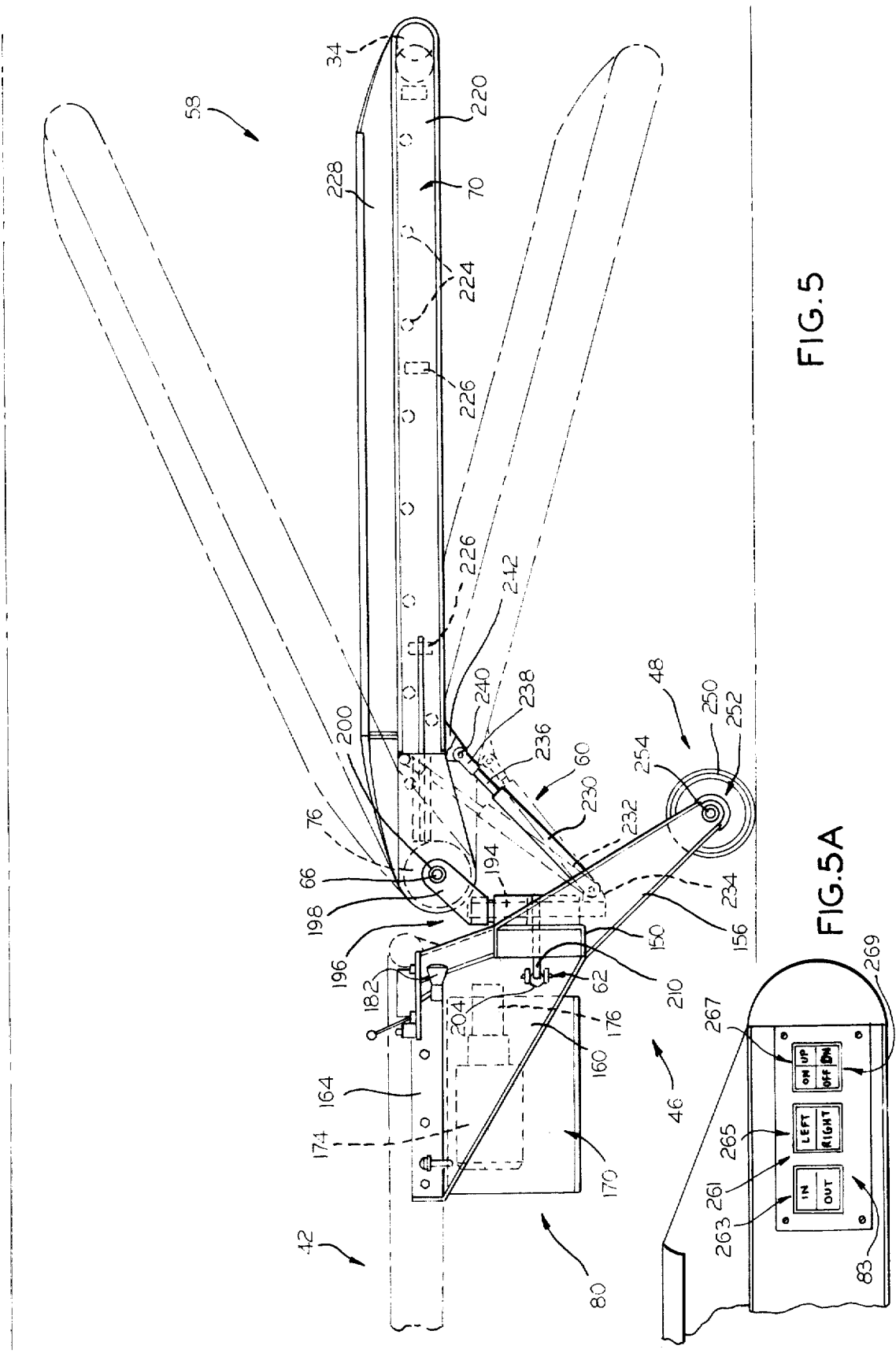

MAIL BAG HANDLING APPARATUS

This application is a continuation of my application Ser. No. 306,006, filed November 13, 1972, now abandoned.

This invention relates to mail bag handling apparatus, and more particularly, to apparatus for transferring bagged mail between an end loading highway vehicle and a loading dock.

My U.S. Pat. No. 3,651,963 discloses a mail bag loading apparatus for loading bagged mail from a loading dock into an end loading highway vehicle that includes a pair of tandem connected run back conveyors mounted on the loading dock for running under existing mail bag handling conveyors that are proportioned lengthwise to extend between the existing conveyor and the desired unloading point in the vehicle. The conveyors are of single bag width and the forward conveyor has its own wheeled frame and is mounted on its frame so that it is bodily movable laterally thereof and its forward end is vertically adjustable relative to its frame for purposes of spotting bags being loaded into the vehicle. The forward conveyor at its forward end carries a special discharge conveyor extending crosswise of the forward conveyor and reversibly driven to discharge bags from either end of same as desired or necessary during the bag loading procedure.

The present invention contemplates a simplified bag handling arrangement in which only one basic conveyor frame, as such, is involved, and a loader head equipped with conveying means operating longitudinally of the basic conveyor is mounted cantilever fashion on the conveyor frame forward end and arranged for close control by an operator standing adjacent to same and monitoring progress of the individual bags being handled across the conveyors.

The principal object of the invention is to provide an apparatus for transferring bag mail between the loading dock and an end loading highway vehicle that permits close control by the operator of the bag piling function through maximum maneuverability of the conveyor apparatus portion that defines the trajectory of the bag and convenient location of power controls for same.

Another important object of the invention is to provide a run out conveyor for loading docks that may be run out from storage under existing bag handling conveyors on the dock and into the vehicle, which run out conveyor is equipped with a cantilever mounted swivelling loader head at its forward end and connected thereto for swivelling action horizontally and vertically thereof with respect thereto to provide a highly maneuverable bag discharge directing implement for accurately controlling bag placement in the vehicle.

Other objects of the invention are to provide a front wheel assembly for run out conveyors that includes a special mounting arrangement for the loading head, to provide a bag loading conveyor arrangement which may be also used to unload the vehicle, and to provide a bag handling arrangement that is economical to manufacture, convenient to use and long lived in operation.

In accordance with this invention, the run out conveyor at its forward end is provided with a special wheel assembly equipped with power driven wheels, a cantilever fashion mounted swivelling loader head arranged for side to side and vertical swivelling action, and a control panel from which the operator controls the speed of the conveyor and discharge of the bags therefrom, the vertical and horizontal inclination of the loader head relative to the run out conveyor, and the forward and rearward movement of the run out conveyor relative to the loading dock. The arrangement is such that the operator standing at the control panel can position the loader head as bags individually travel onto and over same to aim the bag at a suitable point of deposit for the bag. All necessary adjusting movement of the loader head is accomplished by adjusting the controls at the control panel, whereby the operator can give his full attention to the progress of the bags moving toward and over the loader head for effective control over the positioning of same in the vehicle mail bag load.

The apparatus can be employed for unloading operations by reversing the direction of conveyor movement and manipulating the loader head for effective manual loading of the bags onto same.

Other objects, uses and advantages will be obvious or become apparent from a consideration of the following detailed description and the application drawings.

In the drawings:

FIG. 1 is a diagrammatic side elevational view of one embodiment of the invention shown in operation between a loading dock and an end loading highway vehicle that is shown in vertical section, with the retracted position of the conveyor for storage purposes being indicated in broken lines;

FIG. 2 is a plan view of the conveyor as shown in FIG. 1, with the highway vehicle being shown in horizontal section;

FIG. 3 is a view similar to that of FIG. 1 but illustrating a modified form of the invention;

FIG. 4 is a plan view similar to that of FIG. 2 but showing the embodiment of FIG. 3;

FIG. 5 is a fragmental side elevational view on an enlarged scale of the loader head and associated structure of the present invention, showing in broken lines relative positions of adjustment of same;

FIG. 5A is a fragmental elevation of the loader head showing a modification of same;

Figure 6:
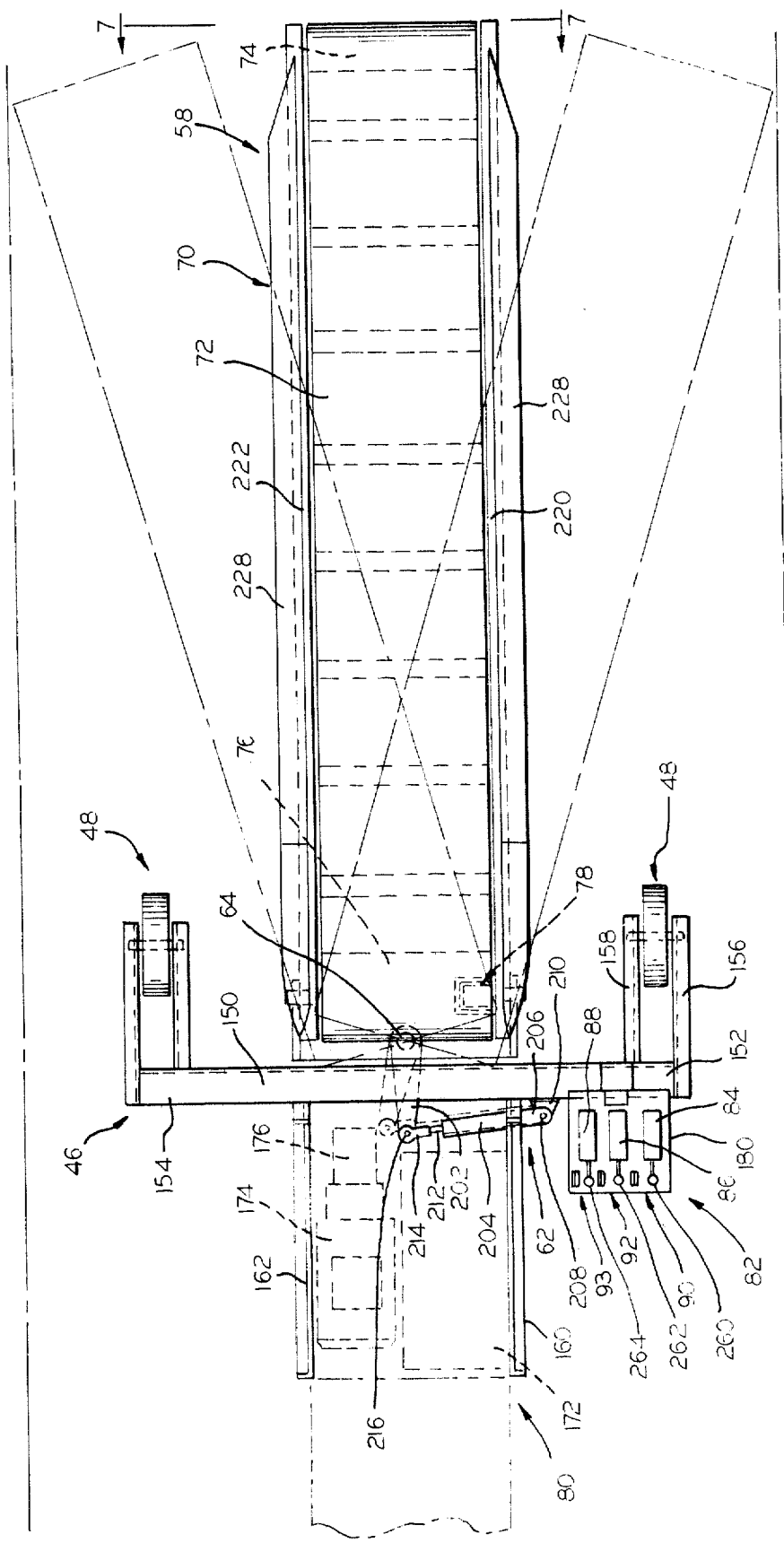
FIG. 6 is a plan view of the structure shown in FIG. 5, with the broken line position of the loader head indicating other positions of adjustment.

However, it is to be distinctly understood that the specific drawing illustrations provided are supplied primarily to comply with the requirements of the patent laws and that the invention may have other embodiments that will be obvious to those skilled in the art and that are intended to be covered by the appended claims.

GENERAL DESCRIPTION

Reference numeral 10 of FIGS. 1 and 2 generally indicates one embodiment of the present invention for loading mail bags from a loading dock into an end loading highway vehicle 14, which vehicle has been illustrated as being in the form of the familiar semitrailer, although the invention is readily applicable to any end loading vehicle proportioned to receive the apparatus 10 in the manner indicated in the drawings.

It is assumed that the mail bag handling installation involved includes the loading dock 12 (of a post office or the like) that is conveniently provided with a level load support surface 16 and the usual shoulder or end 18 to which the vehicle 14 is backed up to a bay 17 for purposes of being loaded.

It is also assumed that the vehicle is in the form of the usual body 20 defined by forward end wall 22, top wall 24, side walls 26 and 28, floor 30, and end opening 32 that is customarily closed by suitable doors or the like (not shown). The body being of the semitrailer type rides on the usual rear wheels 34 and is provided with the usual kingpin 36 for connection to the fifth wheel of a conventional truck tractor (not shown). When disconnected from the truck tractor, the vehicle 14 rests on suitable retractable props 39 adjacent its forward end.

Conveyor 10 generally comprises wheeled frame 40 in the form of suitable conveyor frame 42 having rear wheels 44 and a front wheel assembly 46 journaling a pair of power driven wheels 48. Conveyor frame 42 has suitable conveyor belt 50 trained over same for conveying mail bags between its forward and rearward ends 52 and 54, respectively, with the belt 50 being suitably driven by an appropriate drive mechanism 56 where indicated at FIG. 6 that may be of any suitable type carried by the frame 42, and which preferably may be operated to drive the belt 50 in either direction.

The wheel assembly 46 operably mounts a loader head 58 cantilever fashion for lateral and vertical swinging or swivelling movement, with the head 58 being swung vertically by power operated piston and cylinder device 60, and the head 58 being swung horizontally by power operated piston and cylinder device 62 (see FIG. 6). Head 58 is swung about vertical axis 64 by device 62, and about horizontal axis 66 by device 60.

Figure 7:
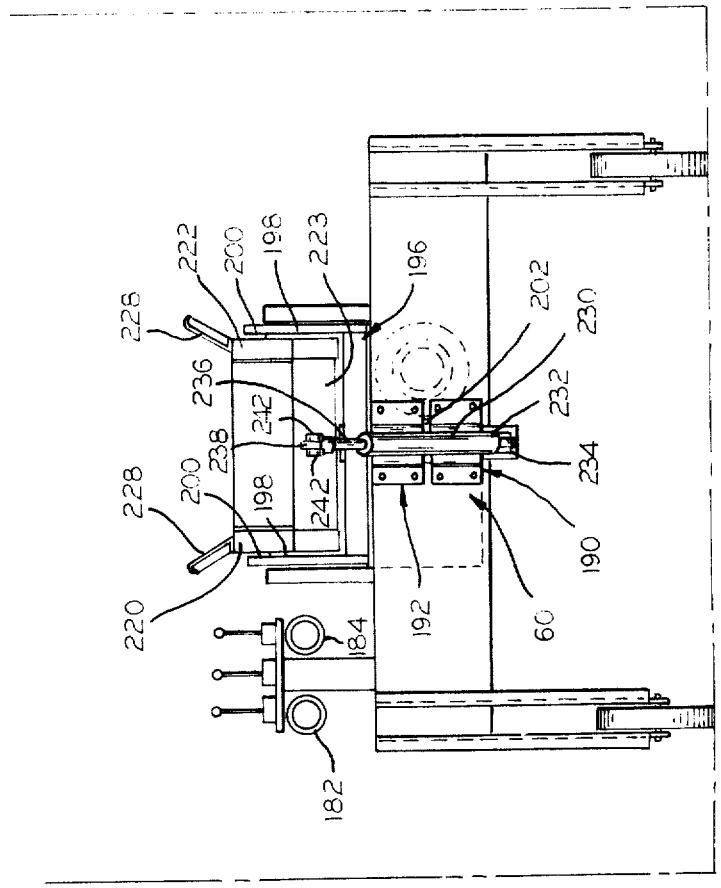
FIG. 7 is a front elevational view of the loader head, taken substantially along line 7—7 of FIG. 6.

The head 58 comprises a conveyor frame 70 having conveyor belt 72 suitably trained over same, including end rollers 74 and 76, with the belt 72 in the form shown in FIGS. 5-7 being driven by a suitable hydlaulic motor indicated at 78 that is operably associated with the end pulley 76.

The wheel assembly 46 in accordance with this invention is an assembly separate and distinct from conveyor frame 42 and includes a power package unit indicated at 80 for operating power devices 62 and 64 and motor 78. Wheel assembly 46 also includes control panel 82 at which the operator stands for the purpose of monitoring the movement of the bags 11 across the conveyor 40 and loader head 58 and manipulating hand operated valves 84, 86 and 88 to control the respective devices 62 and 64 and wheels 48 as needed. Also included on the control panel are push button controls indicated at 90, 92 and 93 for controlling the operation of conveyor belt 50, the motor 78, from an "off-on" standpoint, and the speed of operation of belt 72, respectively. The devices 62 and 64 in wheels 48, and the motor 78 are incorporated in the hydraulic circuit arrangement that is illustrated in FIG. 8 for providing close "fingertip" control for the operator in employing the apparatus 10 to load and unload the vehicle 14.

Figure 8:
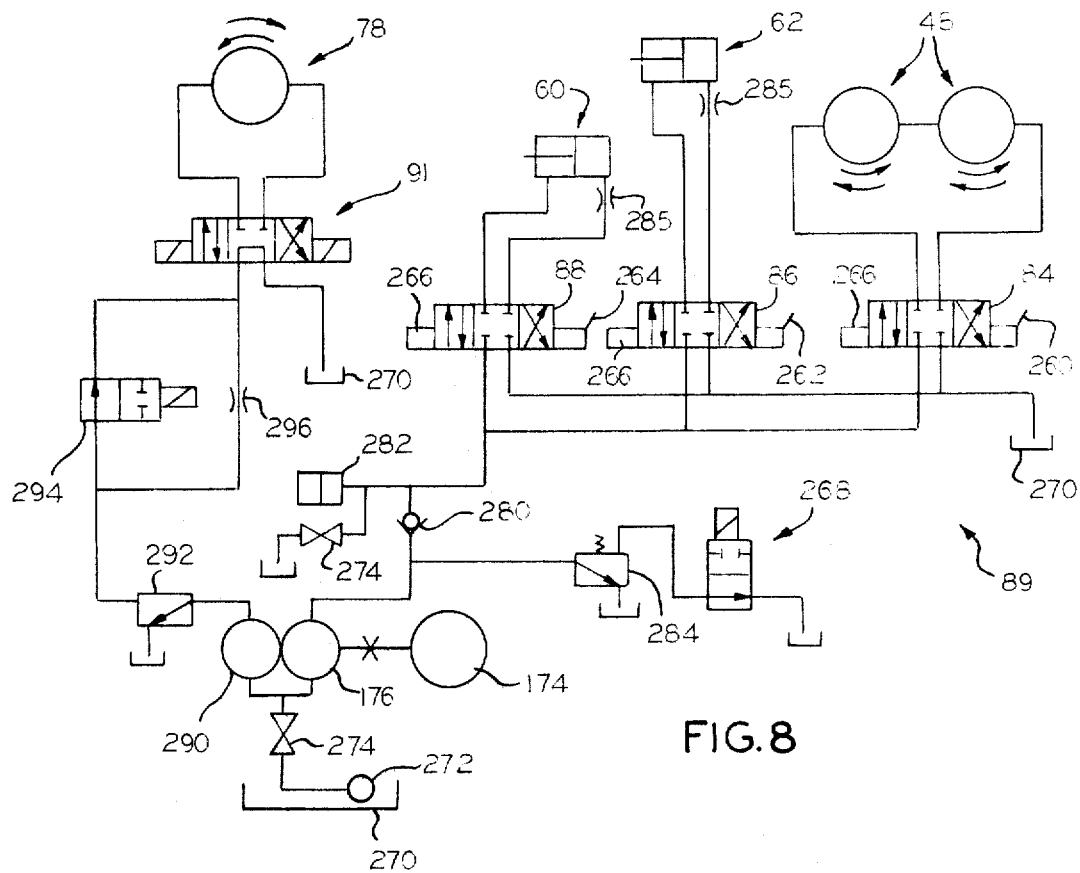
FIG. 8 is a schematic view illustrating a hydraulic control arrangement from the loader head.

The apparatus 10 is adapted to handle cartoned goods or the like in addition to bagged mail, with the hydraulic circuiting of FIG. 8 providing a two speed control for motor 78. For operational purposes, the belt 50 is driven at a speed on the order of 100 to 150 feet per minute, while for handling bagged mail only, the loader head belt 72 is driven at a speed on the order of 500 to 550 feet per minute so as to project or propel the bags into loaded position in the vehicle. Where cartoned goods or the like are to be loaded, belt 72 should be operated at a speed of 100 to 150 feet per minute, and the hydraulic circuit 89 of FIG. 8 makes provision for this variation in speed.

Figure 9:
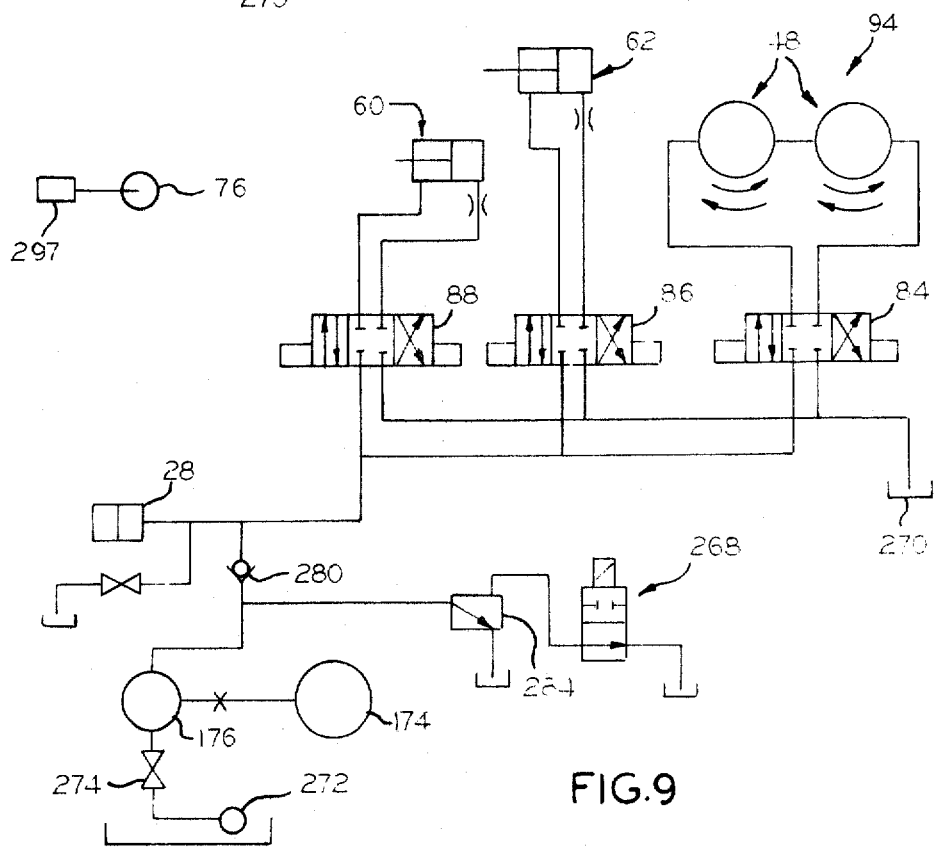
FIG. 9 is a view similar to FIG. 8 but illustrating a modified hydraulic control arrangement.

The hydraulic circuit 94 of FIG. 9 is the same as that for FIG. 8 except this circuit is intended where only bagged mail will be handled, in which case belt 72 can be driven by a suitable electric drive arrangement, thereby eliminating the hydraulic motor 78 and its associated hydraulic equipment.

In use, the apparatus 10 when not needed is retracted to a storage position under the existing conveyor assembly indicated at 100, as indicated by the broken line showing. When the vehicle 14 is backed up for loading at the bay 17, the operator actuates the hydraulic wheels 48 to move the apparatus 10 to substantially the position shown in FIG. 1, and conveyor belts 50 and 72 are actuated to have their upper runs moved to the left of FIGS. 1 and 2. Conveyor frame 42, which has a length on the order of 40 feet, is proportioned to extend under the discharge end 102 of the conveyor apparatus 100 to receive bags proceeding therefrom, which drop onto the belt 50 and are conveyed in single file form longitudinally of the conveyor 40. As a bag 11 approaches the end 52 of the conveyor 40, the operator at control panel 82 positions the loader head 58, by operating power devices 60 and 62, to aim the head 58 in the direction in which the bag in question is to be propelled for purposes of loading it against the vehicle end wall 22. The bag 11 in the meantime is transferring between the belts 50 and 72 and it is immediately brought up to the speed of belt 72 (assuming only mail bags are being handled) for propelling to the spotted position desired by the operator.

Meanwhile the next bag 11 is moving along and as it approaches the end 52 of the conveyor 40, the operator selects the next spot for that bag and positions loader head 58 accordingly, by employing the power devices 60 and 62, so that as the next bag moves over the belt 72, it is aimed at the position where it is to be spotted or loaded in the vehicle.

It is to be noted that no hand manipulation or moving of the loader head 58 is required and that the loader head 58 and its device 60 swing about vertical axis 64 with respect to the remainder of the wheel assembly 46, under the operation of the device 62.

The operator builds up a first stack 104 of the bags 11 against the end wall 22, moving the head about the horizontal axis 66 and vertical axis 64 as needed to give the individual mail bags the trajectory desired. By operating wheels 48, conveyor 40 can be moved forwardly or rearwardly as seems best advised to build up the stack 104 to the top of the vehicle.

When the first stack is completed, the apparatus 10 may be removed rearwardly an appropriate amount, by operating the power wheels 48, to start a second stack 104. This stack is completed in like manner and the indicated loading operation is continued until the loading is completed. The end opening 32 is then closed and the vehicle 14 driven away, with the apparatus 10 being retracted to the broken line position of FIG. 1 for storage purposes to await the next vehicle 14.

The apparatus 10 may also be employed to unload the vehicle 14. For this purpose, the loading dock 12 may be equipped with a suitable conveyor (not shown) to receive mail bags 11 from the belt 50. When a loaded vehicle 14 is backed up to the loading dock at bay 17, its rear end 32 is opened and the bags are manually loaded onto the loader head 58, with the loader head being positioned by operating devices 60 and 62 to facilitate transfer of the bags from their loaded position within the vehicle 14 onto the belt 72 of head 58. As workers operate to load the individual bags 11 onto the loader head 58, the operator at control panel 82 positions the loader head to make convenient the application of specific mail bags thereto. As the bag unloading procedure proceeds, the apparatus 10 is moved forwardly into the vehicle to keep the projecting end of the loader head in close adjacency to the mail bags being worked on. When unloading of the vehicle 14 is completed the apparatus 10 can be left inside to await a new mail bag load for the vehicle, or the apparatus 10 may be retracted back onto the loading dock so that another loaded vehicle can be backed into place for unloading purposes.

As already indicated, the apparatus 10 is also adapted to handle carton goods and the like. Under these circumstances, the belt 72 is operated at the same speed as belt 50 and the operator stands at the projecting end of the loader head 58 in the manner diagrammatically indicated in FIG. 10 to grasp the bags 11 as they move across the loader head to its projecting end, and put the bags in place in the vehicle. The bags are spaced in their order of application to the belt 50 to give the operator the time necessary to appropriately position the bags in the stack 104.

Figure 10:
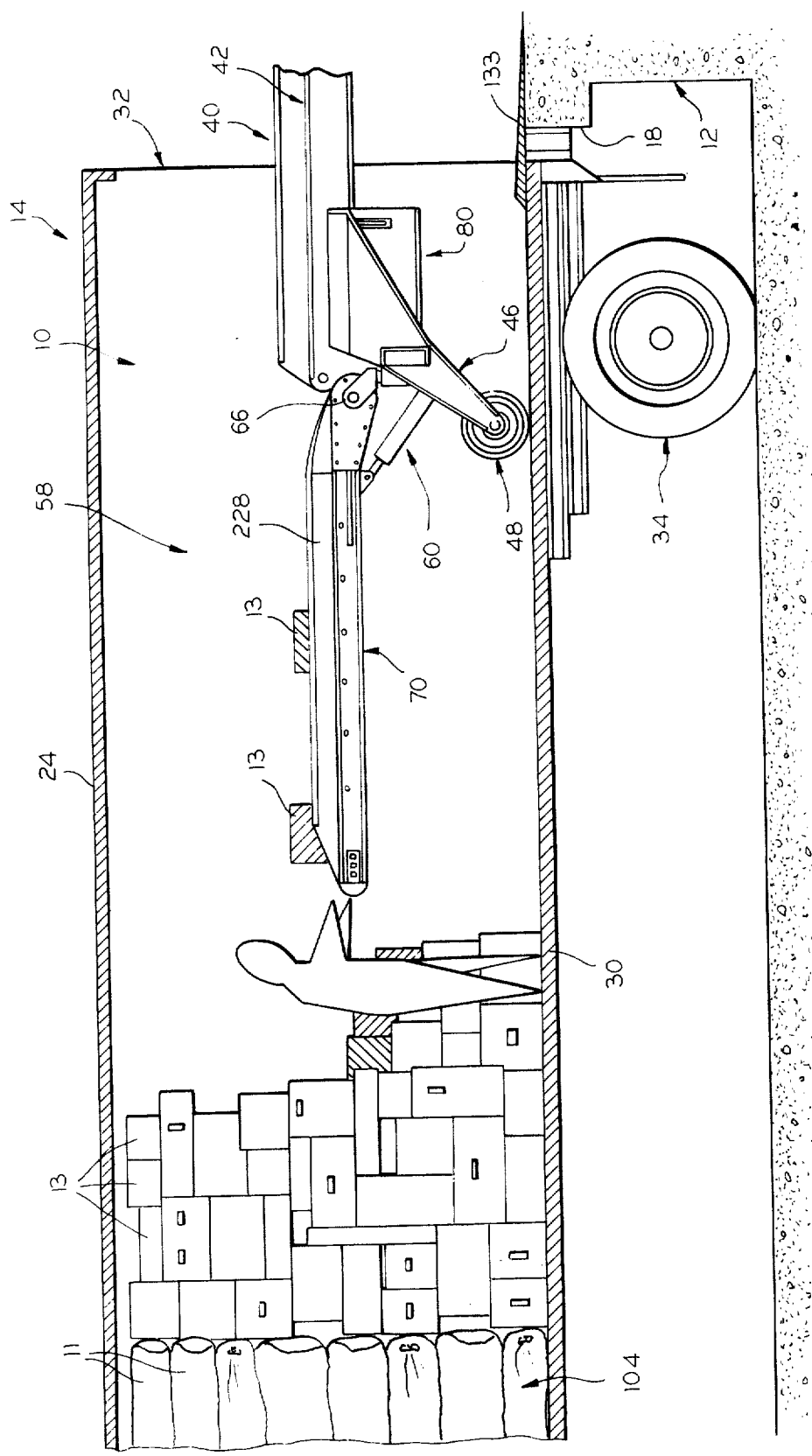
FIG. 10 is a view similar to that of FIG. 1 illustrating the manner of operation for handling mixed mail bag and carton loads.

For handling carton goods, the procedure is similar, with the individual cartons 13 being grasped by the operator standing at the projecting end of the loader head 58 and then the operator stacking the cartons in the manner indicated in FIG. 10.

For this purpose, the loader head is equipped with an alternate set of controls indicated at 83, on either side of the loader head to be operated by push button controls when standing in the position indicated in FIG. 10.

In the apparatus 10A of FIGS. 3 and 4, the run out conveyor 40A is of the telescoping type, that form illustrated comprising a series of conveyor sections 110, 112 and 114 which in the retracted position of the apparatus may be stacked in the manner indicated in broken lines in FIG. 3, against a suitable abutment 116, but which, when a vehicle 14 is to be loaded, is extended by operating a wheel assembly 46 applied to the forward end of frame 110 to move the assembly 10A into the vehicle 14 for operation in the manner already indicated. Conveyor sections 110, 112 and 114 are each equipped with their own belt conveyor, with the section 114 receiving bags from the conventional overhead conveyor and chute structure indicated at 120.

SPECIFIC DESCRIPTION

The loading dock 12 that is illustrated is intended to be representative of conventional loading docks now commonly associated with post office installations or the like that include a number of adjacent bays 17.

Conveyor apparatus 100 is intended to represent any standard conveyor apparatus customarily employed in connection with loading docks employed to handle bagged mail and the like and comprises a suitable framework 130 appropriately equipped with belt conveyor 132 driven by a suitable drive apparatus 134 and leading from a mail sorting installation or the like. The end 102 of the conveyor is downwardly inclined to direct the bags downwardly for application to apparatus 10 or other equipment on the loading dock employed to handle the mail bags.

The vehicle 14 may be of any suitable standard type, that illustrated being intended to represent a typical vehicle now in use in connection with the transportation of bagged mail, though it is to be understood that the invention is equally applicable to other vehicles that are not of the semitrailer type. Suitable bridge plate 133 is employed to facilitate transfer of apparatus 10 between the loading dock and the vehicle 14.

The frame 42 of conveyor 40 comprises side members 136 and 138 suitably joined together and mounting suitable slider plate 140 over which the upper run of belt 50 rides. The drive 56 for the belt 50 may be of any suitable and conventional type and the rear wheels 44 are suitably journaled in the end 54 of the frame 42.

The wheel assembly 46, which, together with its associated loader head 58, comprises the basic component of the invention, is in the form of a basic frame member or beam 150 of channel shaped configuration having affixed to either end 152 and 154 of same spaced channel members 156 and 158 between which the respective wheels 48 are journaled.

Frame member 150 also has affixed thereto a pair of spaced apart brace plates 160 and 162 each defining an upper flange portion 164 that is adapted to be affixed to the respective sides 136 and 138 of frame 42.

Suitably fixed between the plates 160 and 162 is the power package assembly that includes a suitable frame 170 housing a hydraulic liquid reservoir 172, an electric drive motor 174, and hydraulic pump 176 for supplying hydraulic pressure liquid to the devices 62 and 64, hydraulic motor 78 and wheels 48 under the control of the circuiting provided by hydraulic circuit 89.

Operably associated with the end 152 of the beam 150 is the control panel 82, which in the form shown comprises a suitable mounting plate 180 on which the control devices 84, 86 and 88 are suitably mounted together with the control devices 90 and 92 and any other control components that are necessary for the convenience of the operator. In the form shown, control panel also mounts a pair of spot lights 182 and 184 that have their beams directed forwardly of the loader head to facilitate observation of the bag load being worked on.

Beam 150 also has affixed thereto in substantial alignment with the center line of the conveyor 40 a pair of vertically spaced bearing units 190 and 192 of any suitable type that journal spindle 194 for swiveling movement about vertical axis 64. Spindle 194 has fixed thereto at its upper end a suitable clevis structure 196 defining a pair of upstanding arms 198 between which the motor head frame 70 is journaled by suitable stub shafts 200 for swinging movement about pivotal axis 66.

The spindle 144 has keyed thereto crank arm 202 which is disposed about the spindle 194 in the space between the bearing units 190 and 192. The hydraulic power device 62 comprises a hydraulic cylinder 204 having its end 206 pivotally connected as at 208 to suitable lug 210 affixed to beam 150. Operably mounted in the cylinder 204 is a piston (not shown) from which extends piston rod 212 having a clevis 214 on its other end pivotally connected to crank arm 202, as at 216.

The conveyor frame 70 of head 58 comprises a pair of side members 220 and 222 appropriately secured together in spaced apart relation and journaling between same end rollers 74 and 76 and intermediate rollers 224 that support the upper run of the belt 72. Side members 220 and 222 may be connected by suitable cross members 226 and bottom plate 223 and be otherwise reinforced as seems necessary or desirable. Each side member 220 and 222 has a guide panel 228 affixed thereto to keep mail bags moving down the belt 70 centered with respect thereto. Intermediate rollers 224 may be omitted in favor of a slider plate (not shown) as will be obvious to those skilled in the art.

The hydraulic motor 78 may be of any suitable type and is suitably coupled to end roller 76 in any convenient manner.

The power device 60 comprises a hydraulic cylinder 230 having its closed end 232 pivotally connected to a lug 234 suitably affixed to the lower end of the spindle 194. Cylinder 230 suitably mounts a piston (not shown) from which extends piston rod 236 equipped with a suitable fitting 238 that is pivotally connected as at 240 to spaced apart lugs 242 suitably affixed to bottom plate 223 of frame 70.

The power wheels 48 are preferably of the hydraulically driven type comprising a tire equipped rim 250 (see FIG. 5) suitably driven by a hydraulic power device 252 mounted within the rim 250 in a manner comparable or equivalent to conventional hydraulically driven conveyor rollers. The hydraulic drive mechanism 252 is journaled as at 254 between the respective channel members 156 and 158. Wheels 48 may be of the general type disclosed in Patent 3,008,424, it being understood that they are only diagrammatically illustrated in the drawings.

Referring now to the hydraulic circuiting 89, as indicated in FIG. 8, the valve devices 84, 86 and 88 are of the four-way type, each manually actuated by the respective hand levers 260, 262 and 264. Each valve includes a switch, which is shown in block diagram form at 266 that in the switch position shown in FIG. 8 effects energization of solenoid operated valve 268 whereby hydraulic liquid drawn from tank 270 through filter 272 and drain valve 274 by suitable pump 176 (operated by suitable motor 174) returns to tank until the wheels 48 and/or one of the devices 60 or 62 are to be put in operation. When operation of one of these devices is desired, the operating lever of the appropriate valve is positioned to achieve operation in the desired direction, whereby the solenoid valve 268 is deenergized to close that valve, and hydraulic pressure liquid is pumped through check valve 280, through the high pressure side of the hydraulic conduiting involved, and then returned to tank 270. Accumulator 282 is operably associated with the high pressure side of the line to give instantaneous response on actuation of one of the control valves to operate one of the devices 48, 60 or 62, and suitable relief valve 284 is interposed in series between pump 176 and the solenoid valve 268. A suitable drain valve may be employed where indicated at 274 to provide the normal function of such valves, and devices 60 and 62 each has a hydraulic liquid volume flow control valve 285 in series with same.

The hydraulic motor 78 is actuated by appropriately positioning control valve 91 which is of the four-way open center type and solenoid actuated valve control of push button switch 92. Hydraulic pressure liquid is supplied by pump 290 through relief valve 292 and solenoid valve 294 which is push button operated by push button control 93 to shift between the two positions indicated in FIG. 8. The hydraulic liquid return from valve 91 is to tank 270.

The valve 294 in the position shown in FIG. 8 provides the high speed driving of belt 72, and where the lower indicated speed is desirable, valve 294 is shifted by operating control 93 to close same whereby the hydraulic liquid supplied is through flow control valve 296 that limits the volume flow through the system to provide the lower hydraulic motor speed needed to drive belt 72 at the lower speed indicated.

Pumps 176 and 290 may be in the form of a dual pump arrangement suitably driven by suitable motor 174, and in the showing of FIGS. 5–7, these components are shown largely in block diagram form.

The hydraulic circuit 94 of FIG. 9 is the same as circuit 89 except for the elimination of the hydraulic drive for motor 78, which is eliminated in favor of an electric motor 297 for driving roller 76 in accordance with this embodiment of the invention. Roller 76 for this purpose may be suitably reversibly driven by an electric motor through any conventional mechanical coupling arrangement customarily used for drives of this type.

The control arrangement 83 contemplated by FIG. 5A involves a control panel 261 applied to either side of the loader head adjacent its projecting end for convenient operation by the operator standing at the position indicated at FIG. 10 for properly positioning bags and cartons in the vehicle as they are received from the loader head 58. For this purpose, push button controls 263, 265 and 267 control solenoid operated valves replacing the valve devices 84, 86 and 88, respectively. Push button control 269 in the off-on control for the control arrangement 83 whereby the set of controls represented by the showing of FIG. 5A, on either side of the loader head 58 at its projecting end, are rendered operative as alternate controls to those indicated in FIG. 8 insofar as the power wheels 48, and the power devices 60 and 62 are concerned. The wiring arrangement to achieve this end may be of any suitable type.

When utilizing the apparatus 10 in the manner indicated in FIG. 10, the loader head 58 is positioned by operating devices 60 and 62 to facilitate transfer of the bag or carton being positioned within the vehicle from the loader head to a convenient location within the vehicle. For this purpose, the loader head may be elevated or lowered, and moved from side to side to facilitate handling and minimize the lifting and carrying actions required of the operator. It is to be noted that where the controls 83 are employed, the operator moves from a location adjacent control panel 82 to the position indicated at FIG. 10.

The control arrangement 83 may similarly be employed for purposes of unloading the vehicle, with the operator operating the push button controls indicated in FIG. 5, on either side of the loader head, as desired, to position the projecting end of the loader head for convenient application of a carton or bag thereto.

In the apparatus 10A, the wheel assembly 46, which is secured in this instance to the frame 110, and its loading head 58 are the same as in FIGS. 1 and 2, as indicated by corresponding reference numerals.

Frame 110 may be of any suitable type having suitable rear support wheels 300 journaled on suitable rear supports 302. Frame 110 has suitably trained on same conveyor belt 304 suitably driven by the drive 306. The frame 110 in either side of same defines a trackway 310 in which are received the rollers 312 of the respective trolleys 314, secured on either side of the frame 112 for supporting the forward end 315 of frame 112, on frame 110.

Frame 112 includes suitable rear wheels 316 each journaled on the respective rear supports 318, with the frame 112 suitably mounting conveyor belt 320 that is suitably driven by a drive indicated at 321. Frame 112 on either side 322 of same defines trackways 324 in which are received the rollers 326 of the respective trolleys 328, secured on either side of the frame 114 for supporting the forward end 330 of frame 114 on frame 112. Frame 114 is supported by rear wheels 332 suitably journaled on the respective rear supports 334. Frame 114 suitably mounts conveyor belt 336 that is driven by a suitable drive, indicated at 337.

When the apparatus 10A is to be employed, the wheels 48 of the wheel assembly 46 are actuated to move the apparatus 10A from the retracted position shown in broken lines in FIG. 3 to the full line position shown in that figure. The loader head 58 is operated in the manner already described to spot mail bags 11 as they are being loaded. The apparatus 10A may be operated in the reverse direction to unload a vehicle in a manner similar to apparatus A, but in such situation the frame 114 is operably associated with a conveyor onto which the bags may be passed to instead of the overhead conveyor structure 120 shown in FIG. 3.

The foregoing description and the drawings are given merely to explain and illustrate the invention and the invention is not to be limited thereto, except in so far as the appended claims are so limited, since those skilled in the art who have the disclosure before them will be able to make modifications and variations therein without departing from the scope of the invention.

I claim:

1. In bulk handling apparatus for moving elongated bags between a loading dock and the load receiving area of an end loading transport vehicle backed into load transferring relation adjacent the loading dock to dispose its end opening to pass the bags therethrough, said apparatus comprising:

an elongate wheeled conveyor adapted to be movably mounted on the loading dock adjacent the load transferring position of the vehicle and be aligned with the vehicle and its end opening in the load transferring position of the vehicle, said conveyor having a width transversely thereof that approximates the width of the mail bags, said conveyor having a forward end that faces the vehicle when aligned therein and a rearward end extending oppositely of said forward end thereof, said conveyor at said forward end including a forward wheel assembly, said forward wheel assembly comprising:

a frame secured to said conveyor and defining a pair of spaced apart legs each journaling a wheel on which said frame and said conveyor ride, said frame including a vertically disposed spindle journaled for pivotal movement about its longitudinal axis, said spindle axis being substantially aligned with the longitudinal centerline of said conveyor, said spindle having mounted thereon a conveyor head for movement about a horizontal axis extending transversely of said head, said head projecting forwardly of said conveyor, means for swinging said head about said spindle axis to swing said head from side to side relative to said conveyor, and an adjustable strut structure connected between said head and said spindle for supporting said head cantilever fashion from said frame and including means for adjusting the length thereof for adjusting the forward end of said head vertically, said head comprising an elongate frame mounting conveyor means extending longitudinally thereof for conveying mail bags between said conveyor and said head forward end.

2. Apparatus for loading discrete bagged mail and cartoned goods from a loading dock into the load receiving area of an end loading transport vehicle backed into load receiving relation adjacent the loading dock to dispose its end opening to pass the bags and cartons therethrough, said apparatus comprising:

an elongate wheeled conveyor adapted to be movably mounted on the loading dock adjacent the load transferring position of the vehicle and be aligned with the vehicle and its end opening in the load transferring position of the vehicle for movement into and out of the vehicle, said wheeled conveyor having a width transversely thereof that approximates the width of the mail bags, said wheeled conveyor having a forward end that faces the vehicle when aligned therewith and a wheeled rearward end extending oppositely of said forward end thereof, said wheeled conveyor having operably mounted on same between said ends thereof conveyor belt means defining an upwardly facing load transport surface, said wheeled conveyor at said forward end including a forward wheel assembly, said forward wheel assembly comprising:

a frame secured to said conveyor in supporting relation thereto and including a cross beam extending transversely of said conveyor and projecting to either side of same, said cross beam being proportioned transversely of said wheeled conveyor to enter the vehicle end opening and having a leg secured adjacent each end of same outboard of said conveyor, with each leg journaling a hydraulically operated wheel assembly on which said frame and conveyor forward end ride, said cross beam having mounted thereon a vertically disposed spindle journaled for pivotal movement about its longitudinal axis, with said spindle being positioned so that its said axis is substantially aligned with the longitudinal center line of said conveyor, said spindle having a clevis structure affixed thereto on the upper end of same and supported thereby for pivotal movement therewith, a conveyor head frame mounted on said clevis structure by being journaled thereon for pivotal movement about a substantially horizontal axis, said conveyor head frame being mounted on said clevis structure cantilever fashion at one end thereof with the other end thereof projecting forwardly of said wheeled conveyor, said conveyor head frame having a conveyor belt trained over same between said ends thereof presenting an upwardly facing load transport surface, hydraulic motor means mounted on said conveyor head frame for driving said conveyor belt, a first hydraulically operated piston and cylinder device pivotally connected between said conveyor head frame and said spindle lower end for supporting said conveyor head frame cantilever fashion from said spindle and for swinging same vertically about said horizontal axis, an actuator arm fixed to said spindle and projecting laterally thereof in horizontal alignment with said cross beam, a second hydraulically operated piston and cylinder device pivotally connected between said arm and said cross beam in horizontal coplanar relation with said arm and said beam and in leverage applying relation to said arm for pivoting said spindle about its said axis to swing said head frame horizontally about said spindle axis, said wheel assembly adjacent one end of said cross beam defining a forwardly facing operator's station on one side of said conveyor head frame including main control panel means including hand operated means for controlling said hydraulic motor means, said piston and cylinder devices, and said wheel assemblies, hydraulic pressure liquid supply means carried by said forward wheel assembly, hydraulic circuit control means interconnecting said hydraulic liquid supply means, said hydraulic motor means, said piston and cylinder devices, said hydraulically operated wheel assemblies, and said main control panel means for operating same from said main control panel means, said hydraulic circuit control means including means for alternately operating said hydraulic motor means to drive said head frame belt at a higher bag propelling speed for projecting bags from said head frame projecting end, and to drive said head frame belt at a lower carton delivery speed for hand removal of the discrete cartons from said head frame projecting end, said head frame having on each side of same adjacent said projecting end thereof supplemental control panel means interconnected with said hydraulic circuit control means and including hand operated control means controlling said piston and cylinder devices and said hydraulically operated wheel assemblies from an operating position at said projecting end of said head frame, said load transport surface of said head frame belt adjacent said spindle axis being substantially level with said wheeled conveyor belt means load transport surface, whereby, for loading bagged mail into the vehicle the operator may stand at said operator's station and operate said mail control panel means to operate said hydraulic motor means to drive said head frame belt at said higher bag propelling speed, as well as operate said piston and cylinder devices to position said head frame projecting end horizontally and vertically relative to the vehicle to fling load said bags in stacked relation within the vehicle area, and for loading cartoned goods into the vehicle the operator may stand at said head frame projecting end position and operate convenient of said supplemental panel means to operate said hydraulic motor means to drive said head frame belt at said lower carton delivery speed as well as operate said piston and cylinder devices to position said head frame projecting end horizontally and vertically for ready manual stacking of the cartons in the vehicle.

3. The apparatus set forth in claim 2 wherein:
said wheeled conveyor has a permanent length on the order of forty feet.

4. The apparatus set forth in claim 2 wherein:
said wheeled conveyor is telescoping in nature.

5. The apparatus set forth in claim 2 wherein:
said bag propelling speed is on the order of 500 to 550 feet per minute, and said carton delivery speed is in the range of from approximately 100 feet per minute to approximately 150 feet per minute.

* * * * *